United States Patent [19]

Dreiling

[11] 4,242,708
[45] Dec. 30, 1980

[54] TAPE RECORDING APPARATUS USING CAPACITIVE DETECTORS AS TAPE POSITION SENSORS

[75] Inventor: James A. Dreiling, Denver, Colo.

[73] Assignee: Honeywell Inc., Minneapolis, Minn.

[21] Appl. No.: 7,801

[22] Filed: Jan. 30, 1979

[51] Int. Cl.³ .................. G11B 15/06; G11B 23/30
[52] U.S. Cl. .................. 360/74.5; 360/71; 360/93
[58] Field of Search .............. 360/74.5, 74.1, 74.4, 360/74.6, 74.7, 132, 134, 85, 90, 93, 96.1, 49, 73; 242/191, 192, 186, 188; 200/DIG. 1

[56] References Cited

U.S. PATENT DOCUMENTS

| | | | |
|---|---|---|---|
| 3,566,132 | 2/1971 | Walker | 250/214 |
| 3,695,550 | 10/1972 | Lennox | 242/191 |
| 3,730,453 | 5/1973 | Hotchkiss et al. | 242/191 |
| 3,834,648 | 9/1974 | Rose, Jr. et al. | 242/186 |
| 3,834,649 | 9/1974 | Papay | 242/191 |
| 3,851,116 | 11/1974 | Cannon | 360/73 |
| 3,940,790 | 2/1976 | Conroy et al. | 360/39 |
| 3,942,190 | 3/1976 | Detwiler | 360/90 |
| 4,003,093 | 1/1977 | Satoh | 360/137 |
| 4,044,233 | 8/1977 | Sato | 360/137 |
| 4,093,149 | 6/1978 | Shroff et al. | 242/198 |

FOREIGN PATENT DOCUMENTS 396708 1/1974 U.S.S.R. .................. 360/74.7

Primary Examiner—Alfred H. Eddleman
Attorney, Agent, or Firm—Laurence J. Marhoefer; Lockwood D. Burton

[57] ABSTRACT

An improved beginning-of-tape/end-of-tape sensor for magnetic recording apparatus includes a metalic foil strip adhered to the reverse side of the magnetic record, the opposite side from the oxide, and positioned at the desired longitudinal positions on the tape. A pair of capacitive detectors are positioned adjacent the oxide surface of the tape to detect a change in capacitance when the metalic foil on the opposite side of the tape effectively bridges the two capacitive detectors. A digital logic comparator is provided for responding to the capacitance change to produce a signal representative of the beginning of tape or end of tape condition.

10 Claims, 4 Drawing Figures

TAPE RECORDING APPARATUS USING CAPACITIVE DETECTORS AS TAPE POSITION SENSORS

CROSS REFERENCE TO OTHER PATENTS

Reference is made to U.S. Pat. No. 4,093,149, Shroff et al; U.S. Pat. No. 4,094,478, Shroff et al; and U.S. Pat. No. 4,095,758, Shroff.

BACKGROUND OF THE INVENTION

The present invention relates to information recording apparatus. More particularly, it relates to apparatus for sensing the beginning of the tape or the end of the tape in a magnetic recording apparatus wherein the magnetic record member is contained in a cartridge.

In magnetic recording systems, there has arisen a need for means for determining the approaching end of a tape when the tape is moving in the forward direction or the approaching beginning of the tape when the tape is moving in a reverse direction. In systems provided heretofore, there have been a number of approaches to providing signals representative of those conditions. In one previous approach, a metal foil element is secured to the reverse side of the magnetic record tape a predetermined distance before the end of the tape in either direction, a light source is provided, light from which is reflected by the metalic foil onto a photocell to provide a signal indicative of the presence of the foil element. In a variation of the same approach, a pair of conductive contacts engaged the reverse side of the tape and are shorted by the metalic foil when it engages the contacts. In both of these previous approaches, access must be had to the reverse side of the tape. In other previous approaches to solving the problem, various forms of tachometer devices have been employed to provide count signals representative of the amount of tape remaining on a reel. These have required unduly complex mechanical and electronic structures to provide the required signals. Still others have provided recorded signals on the face of the tape to be detected by a magnetic transducer. These either require a separate playback system and auxiliary data tracks on the tape or they interfere with the intelligence data recorded on the tape itself. In either case the result is undesirable. Further, the recorded signals are subject to being erased inadvertently.

In certain magnetic tape recording systems, the tape is permanently contained within a cartridge such as is shown in the referenced Shroff patents. In such a cartridge, access is not available to the reverse side of the magnetic record member. Further, it is desirable to not apply keying elements to the oxide side of the record member; these would interfere with the normal operation of the recorder system.

SUMMARY OF THE INVENTION

It is, accordingly, an object of the present invention to provide an improved magnetic recording apparatus.

It is another object of the present invention to provide an improved beginning of tape and end of tape sensing means for magnetic tape recorders.

It is a further object of the present invention to provide an improved end of tape/beginning of tape sensor as set forth which neither interferes with the normal operation of the tape system nor requires access to the reverse side of the tape during operation for sensing.

In accomplishing these and other objects, there has been provided, in accordance with the present invention, an improved beginning of tape/end of tape sensor means or magnetic recording apparatus wherein a metallic foil strip is adhered to the reverse side of the magnetic record, the opposite side from the oxide, and positioned at the desired longitudinal positions on the tape. A pair of capacitive detectors are positioned adjacent the oxide surface of the tape to detect a change in capacitance when the metallic foil on the opposite side of the tape effectively bridges the two capacitive detectors. A digital logic comparator is provided for responding to the capacitance change to produce a signal representative of the beginning of tape or end of tape condition.

BRIEF DESCRIPTION OF THE DRAWING

A better understanding of the present invention may be had from the following detailed description when read in the light of the accompanying drawings, in which.

DETAILED DESCRIPTION

Figure 1:
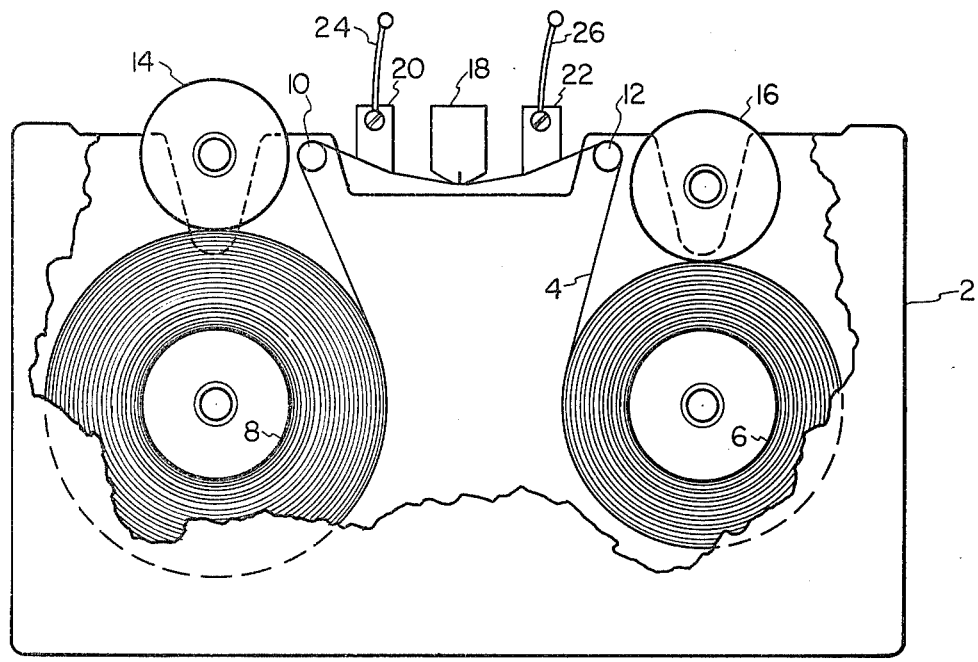
FIG. 1 is an outline sketch of a tape recording system embodying the present invention.

In FIG. 1 there is shown a portion of a tape recording system of the type set forth and claimed in the aforementioned Shroff patents. The apparatus includes a cartridge 2 in which a length of magnetic recording tape 4 is supported on a first rimless hub or spool 6 and a second rimless hub or spool 8. The tape extends from one hub past a first tape guide member 10 and a second tape guide member 12 to the other hub 6. The tape contained in the cartridge 2 may be several hundred feet in length, in one exemplary embodiment the tape was six hundred feet in length. The tape is driven, without a capstan by a pair of driving rollers 14 and 16, respectively, engaging the periphery of the tape rolled onto each of the two hubs 6 and 8. The details of the driving features are shown in the aforementioned Shroff patent or the Shroff et al patents. When the cartridge is not in operative position in the recording apparatus, the span of tape between the tape guides 10 and 12 assume the straight line path. When, however, the cartridge is inserted in operative position within the recording apparatus, the span of tape between the tape guide 10 and 12 is deflected from a straight line path by engagement with a record/reproduce head 18 and a pair of sensing electrodes.

In a preferred embodiment as shown in FIG. 1, a first capacitive sensing electode 20 is positioned to engage the oxide surface to the tape between the tape guide 10 and the record/reproduce head 18. A second capacitive sensing electrode 22 is positioned to engage the oxide surface of the tape between the transducer 18 and the tape guide 12. A connecting lead 24 from the electrode 20 and a connecting lead 26 from the electrode 22 are connected to a capacitance detecting circuit to be discussed hereinafter.

Figure 2:
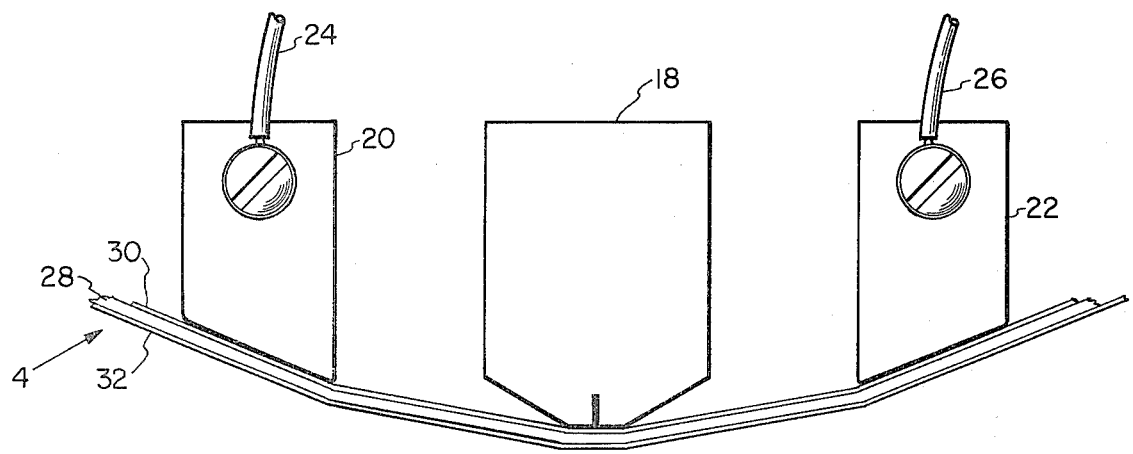
FIG. 2 is an enlarged representation illustrating the sensor structure in accordance with the present invention.

In FIG. 2 there is shown an enlarged detail view of the structure in the vicinity of the record/reproduce head and the capacitive sensors. Specifically the record- /reproduce head or transducer 18 is shown with the electrode 20 at one side thereof and the electrode 22 on the other side thereof. The tape 4 substrate is shown as comprising a non-conductive substrate, or carrier member, such as Mylar, 28 and having a magnetic oxide coating 30 on one side thereof. The oxide surface of the tape is positioned to engage both the magnetic transducer 18 and the two sensor electrodes 20 and 22. On the uncoated or opposite side of the Mylar tape 28, there is positioned a strip 32 of metallic foil. The foil is positioned on the tape a predetermined distance from the absolute end of the tape at which point it is desired to generate a signal representative of the end of the tape. In an exemplary embodiment of the present invention, that foil member was positioned five feet from the absolute beginning of the tape and another was positioned five feet from the absolute end of the tape. The length of the foil member 32 is slightly longer than necessary to bridge between the surfaces the two electrodes 20 and 22. Since the metallic foil 32 is, in fact, an electrical conductor, the structure shown in FIG. 2 is effectively two capacitors connected in series with the two electrodes 20 and 22 comprising the extreme electrodes and the metal foil 32 comprising the mean electrode between the two. The magnetic tape constitutes the dielectric material between the electrodes of the two capacitors. In actual practice, it will be appreciated that the two electrodes 20 and 22 are firmly secured to the structure of the recording apparatus but electrically isolated from any conductive structure other than the leads 24 and 26.

Figure 3:
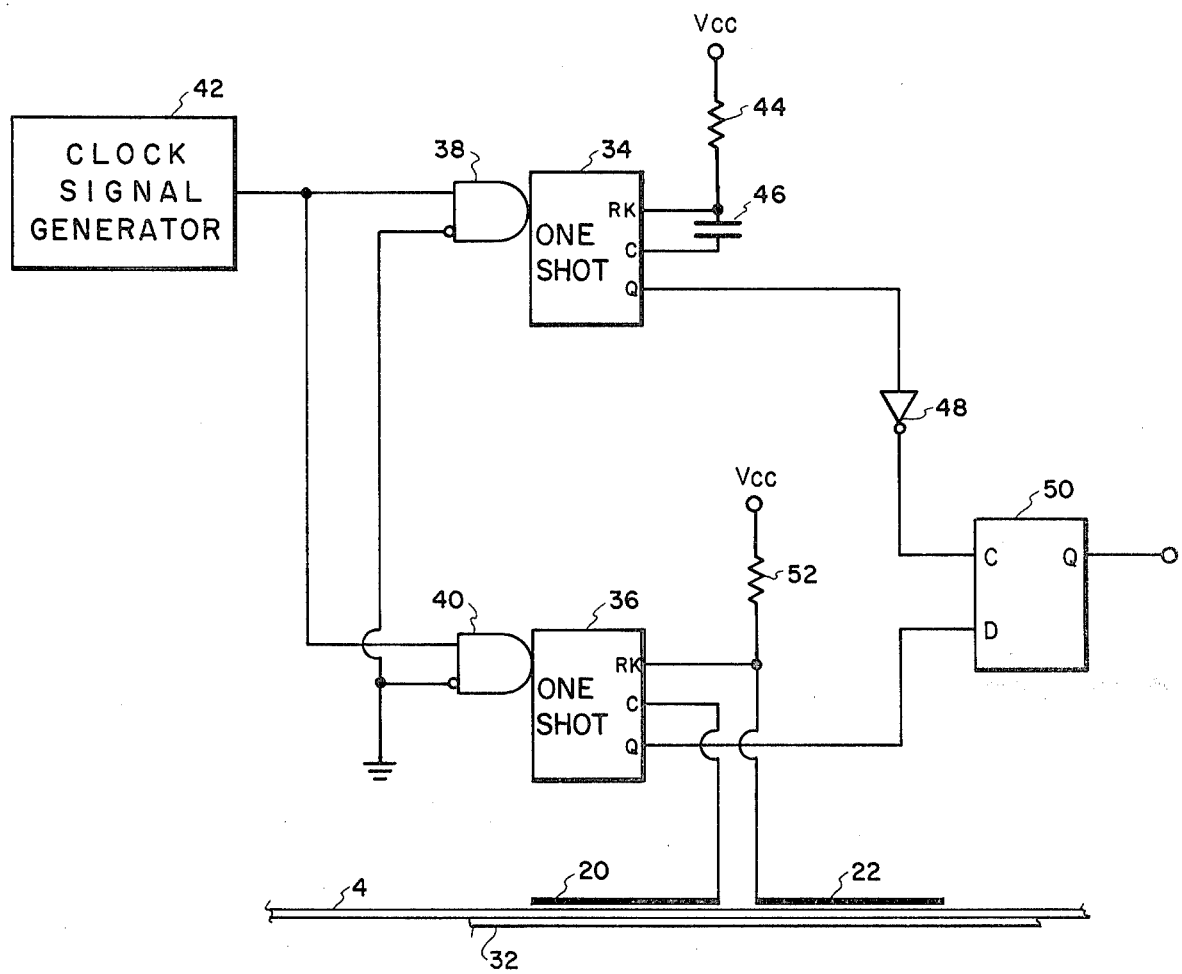
FIG. 3 is a logic block diagram of a sensor circuit in accordance with the present invention.

In FIG. 3 there is shown a binary comparator circuit for detecting a capacitance change incident to the presence of the foil 32 in position opposite the electrodes 20 and 22. In the circuit shown in FIG. 3, there is shown a first one-shot multivibrator 34 and a second one-shot multivibrator 36. The input to the one-shot 34 is through a gate member 38 while the input to the second one-shot 36 is through a second gating member 40. In the exemplary embodiment of the present invention, the one-shot multi-vibrators 34 and 36 along with the gating input structures 38 and 40 were all contained in a single integrated circuit module of the type identified as SN74221 manufactured by, among others, Texas Instruments, Inc.

A characteristic of each of the one-shot multivibrator circuits is that they may be triggered to an "on" condition by an input pulse. Such an input pulse is supplied to the input circuits from a clock signal generator 42. The length of the pulse produced by each of the one-shot multivibrators 34 and 36 is determined by an external resistor-capacitor circuit connected to the external control terminals designated R/C and C. In the circuits in accordance with the present invention, the first one-shot multi-vibrator 34 has a fixed resistor 44 and a capacitor 46 connected to the external control terminals of the one-shot multivibrator. The "Q" output terminal of the module 34 is connected through an inverter 48 to the toggle input of a flip-flop 50. The same clock signals from the clock signal generator 42 is applied to the input 40 of the second one-shot multi-vibrator 36. A fixed resistor 52 is connected to the R/C external control terminal of the multivibrator 36. The capacitive sensing electrode 22 is also connected to the same external control terminal as the resistor 52. The capacitive sensing electrode 20 is connected to the "C" external control terminal of the one-shot multivibrator 36. The "Q" output terminal of the module 36 is connected to the "D" input of the flip flop 50. The flip flop 50, in the aforementioned exemplary embodiment of the present invention was of the integrated circuit module type identified as SN7474 and manufactured by, among others, Texas Instruments, Inc. The "Q" output terminal of the flip flop 50 is connected to an output utilization circuit and carries the end-of-tape or beginning-of-tape signal.

In operation, the first one-shot multivibrator is used as a reference signal source with a preestablished pulse width determined by the external resistor 44 and the capacitor 46. In the exemplary embodiment, the clock signal generator 42 produced signals of a 10 kilohertz frequency as shown in the first line of FIG. 4 and designated "clock". The first one-shot multivibrator 34 comprises a reference signal source which is triggered by the rising edge of the clock pulse and with a pulse width determined by the external resistor 44 and the external capacitor 46. The output signal appearing at the "Q" output terminal is thus a fixed pulse width signal appearing at the clock frequency and is shown in the second line of FIG. 4 the line identified as "Q-reference."

Figure 4:
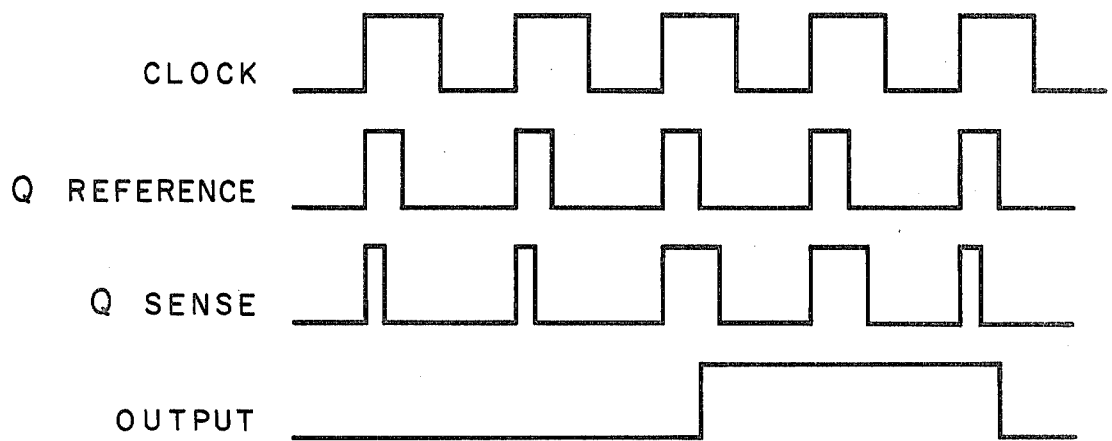
FIG. 4 is a table of wave shapes useful in understanding the present invention.

The clock pulse from the clock signal generator 42 applied through the input circuitry 40 of the second one-shot multivibrator 36 also triggers the output of that circuit to an "On" condition. In this circuit, the pulse-width is determined by the external resistor 52 and the capacitance appearing across the electrodes 20 and 22. When the tape 4 is running, and the foil member 32 is not in position bridging the electrodes 20 and 22, the capacitance detected and applied to the control circuitry of the multivibrator 36 is the system stray capacitance. That capacitance is relatively small. Under those conditions, the pulse-width of the output signal appearing at the "Q" output terminal of the module 36 is of shorter duration than the reference signal appearing at the "Q" output terminal of the reference multivibrator 34. That relationship is shown in FIG. 4 wherein the output signal from the module 36 is shown at the third line and designated "Q-sense". There it may be clearly seen that the first two pulses are of smaller pulse-width than the "Q-reference" signals.

The characteristic of the flip flop 50 is such that the "Q" output terminal goes "high" whenever a signal is applied to the input terminal which goes from a "low" to a "high" condition if the signal applied to the "D" input terminal was a logical "high" condition to enable the flip flop. Inasmuch as the output signal from the reference module 34 is coupled through an inverter 48 to the "C" input terminal of the flip flop 50, the flip flop 50 will be triggered on the negative stroke of the "Q-reference" signal, whenever the flip flop 50 is enabled by a positive signal at the D input terminal. So long as the "Q-sense" signal is of shorter duration than the "Q-reference" signal, the condition for turning on the flip flop 50 is not present.

When the foil member 32 affixed to the reverse side of the tape 4 is in position to bridge the two electrodes 20 and 22, the resultant capacitance is much larger than the stray capacitance hereinbefore referred to. In the presence of that much larger capacitance incident to the presence of the foil strip 32, the pulse width of the "Q-sense" pulse will be wider than the pulse of the "Q-reference" signal as shown in the third and forth pulses of FIG. 4. When the "Q-sense" pulse is wider than the "Q reference" pulse, the negative stroke of the "Q reference" pulse will trigger the flip flop 50 to an "on" condition because the flip flop 50 will be enabled by the positive signal at the "D" input thereof. Thus, the forth line of the wave shape signals shown in FIG. 4 goes from a logical "low" to a logical "high" on the negative sweep of the third shown reference signal.

When the foil member 32 has passed the position of the electrodes 20 and 22, the pulse width of the sensing one-shot multivibrator 36 will again be narrower than the pulse width of the "Q-reference" signal as represented in the fifth set of pulses in FIG. 4. Therefore, on the negative stroke of the "Q-reference", signal the flip flop 50 will again be switched to a "low" output state.

With the apparatus thus provided, the circuit of FIG. 3 is a binary capacitance comparator which comprises an effective and accurate capacitance change detector with a relatively simple structure and operation. The utilization of the capacitance change detection as a means of providing an end-of-tape or beginning-of-tape signal enables the development of such signals by apparatus which operates from the oxide side of the magnetic record tape without interfering with the normal recording operation of the system, even during the generation of the desired end-of-tape or beginning-of-tape signals. Access is not required to the reverse side of the tape during operation in order to respond to the foil signal member affixed to that reverse side.

The embodiments of the invention in which an exclusive property or privilege is claimed are defined as follows:

1. A position detector for tape recorder/reproducer apparatus comprising:
   a non-conductive record tape, having a front side and reverse side, adapted to be driven from one storage spool to another;
   a conductive member secured to said reverse side of said tape at a predetermined longitudinal position thereof;
   capacitive electrode means positioned to engage said front side of said tape along the path of movement from said one spool to the other; and
   capacitive detection means connected to detect the passage of said conductive member past said electrode means.

2. A position detector for tape recorder/reproducer apparatus comprising:
   a non-conductive record tape, having a front side and a reverse side, adapted to be driven from one storage spool to another;
   a conductive member secured to said reverse side of said tape at a predetermined longitudinal position along said tape;
   capacitive electrode means positioned to engage said front side of said tape along the path of movement from said one spool to the other;
   capacitive detection means connected to detect the passage of said conductive member past said electrode means; and
   output signal means connected to be responsive to said detection means to produce an output signal indicative of the passage of said conductive member past said electrode means.

3. A position detector for tape recorder/reproducer apparatus comprising;
   a non-conductive record tape, having a front record bearing side and a reverse side, adapted to be driven from one storage spool to another;
   a conductive foil member secured to said reverse side of said tape at a position a predetermined distance from an end of said tape;
   capacitive electrode means positioned to engage said front side of said tape along the path of movement from said one spool to the other;
   capacitive detection means including a binary capacitance comparator connected to detect a capacitance change incident to the passage of said conductive member past said electrode means; and
   output signal means connected to be responsive to said detection means to produce an output signal responsive of the passage of said conductive member past said electrode means and indicative of the approach of said end of said tape.

4. A position detector as set forth in claim 3 wherein said capacitive electrode means comprises a first and a second electrode member positioned in spaced relation and forming a capacitor with said foil member on said tape when said foil member bridges said first and second electrode members.

5. A position detector as set forth in claim 4 wherein said capacitances comparator comprises a first one-shot multivibrator having an output pulse width determined by a reference capacitor, and a second one-shot multivibrator having an output pulse width determined by the capacitance of said capacitive electrode means, said first and second multivibrators being triggered by a common clock pulse.

6. A position detector as set forth in claim 5 wherein said output signal means includes a flip-flop circuit having an enable input connected to the output of said second one-shot multivibrator and a toggle input connected to the output of said first one-shot multivibrator to produce an output signal whernever said output pulse width of said second multivibrator is greater than the output pulse width of said first multivibrator.

7. A binary capacitance change detector comprising:
   a reference pulse generator having an output pulse width determined by a reference capacitor;
   a sensing pulse generator having an output pulse width determined by a condition sensing capacitor;
   said output pulse from said reference pulse generator being normally of greater width than said output pulse from said sensing pulse generator in the absence of a predetermined condition, said output pulse from said sensing pulse generator being of greater width than said output pulse from said reference pulse generator when said predetermined condition is present to change the capacitance of said sensing capacitor, and
   output circuit means connected to be responsive to said output pulse from said reference pulse generator and said output pulse from said sensing pulse generator to produce an output signal when said predetermined condition is present.

8. A binary capacitance change detector as set forth in claim 7 wherein said output circuit means includes a flip-flop circuit having an enable input terminal connected to the output of said sensing pulse generator and a toggle input terminal connected to the output of said reference pulse generator.

9. A binary capacitance change detector as set forth in claim 8 wherein:
   said reference pulse generator includes a first one-shot multivibrator
   said sensing pulse generator includes a second one-shot multivibrator, and
   said first and second multivibrators being triggered by a common input clock pulse.

10. An end-of-tape detector for tape recorder/reproducer apparatus comprising:

a non-conductive record tape, having a front record bearing side and a reverse side, adapted to be driven from one storage spool to another;

a conductive foil member secured to said reverse side of said tape at a position a predetermined distance from an end of said tape;

capacitive electrode means positioned to engage said front side of said tape along the path of movement from said one spool to the other, said electrode means including a first electrode member positioned adjacent said path and a second electrode member spaced from said first electrode also positioned adjacent said path, said foil member being of a size to bridge the distance between said spaced electrode members in its passage along said path;

said electrode members exhibiting a first capacitance value representative of stray capacitance in the absence of said bridging of said foil member and a second, higher, capacitance value in the presence of said bridging foil member;

a capacitive detection means including a binary capacitance comparator connected to detect the capacitance change incident to the passage of said foil member past said electrode means;

said capacitance comparator comprising a reference pulse generator, including a first one-shot multivibrator, having an output pulse width determined by a reference capacitor connected thereto, and a sensing pulse generator, including a second one-shot multivibrator, having an output pulse width determined by the capacitance value of said electrode members connected thereto, said first and second multivibrators being triggered by a common input clock pulse;

said output pulse from said reference pulse generator being normally of greater width than said output pulse from said sensing pulse generator at said first capacitance value, said output pulse from said sensing pulse generator being of greater width than said output pulse from said reference pulse generator at said second capacitance value, and output circuit means including a flip-flop circuit having an enable input terminal connected to the output of said sensing pulse generator and a toggle input terminal connected to the output of said reference pulse generator to produce an output end-of-tape signal on the passage of said foil member past said electrode elements.

* * * * *